United States Patent [19]

Ward et al.

[11] Patent Number: 5,580,002

[45] Date of Patent: Dec. 3, 1996

[54] METHOD AND APPARATUS FOR HEATING AND GRINDING MATERIALS

[75] Inventors: Arthur G. T. Ward, Wollaton; David J. Ball, West Bridgford; Philip Curtis, Castle Donnington; Edward Varney, Ruddington Nottingham, all of United Kingdom

[73] Assignee: BPB Industries Public Limited Company, Slough, United Kingdom

[21] Appl. No.: 295,001

[22] Filed: Aug. 24, 1994

[30] Foreign Application Priority Data

Aug. 27, 1993 [GB] United Kingdom ............... 9317849

[51] Int. Cl.⁶ .......................... B02C 23/24; B02C 23/32
[52] U.S. Cl. .................... 241/17; 241/18; 241/23; 241/65; 241/117
[58] Field of Search .................... 241/17, 18, 23, 241/57, 65, 117–122

[56] References Cited

U.S. PATENT DOCUMENTS

| | | |
|---|---|---|
| 1,984,201 | 12/1934 | Senseman . |
| 3,236,509 | 2/1966 | Blair . |
| 3,348,819 | 10/1967 | McIlvaine ............................ 241/57 X |
| 4,176,157 | 11/1979 | George et al. . |
| 4,370,198 | 1/1983 | Déncs et al. ........................ 241/57 X |
| 4,511,093 | 4/1985 | Ohkoshi et al. ..................... 241/65 X |
| 4,629,419 | 12/1986 | Ward et al. . |
| 4,915,623 | 4/1990 | Ball et al. . |
| 4,919,341 | 4/1990 | Lohnherr ............................. 241/57 X |
| 5,011,668 | 4/1991 | Ball et al. . |

FOREIGN PATENT DOCUMENTS

| | | |
|---|---|---|
| 540961 | 12/1984 | Australia . |
| 2126527 | 11/1972 | Germany . |
| 394033 | 6/1933 | United Kingdom . |
| 872269 | 7/1961 | United Kingdom . |
| 1080605 | 8/1967 | United Kingdom . |
| 1193761 | 6/1970 | United Kingdom . |
| 2046121 | 11/1980 | United Kingdom . |
| 2070750 | 9/1981 | United Kingdom . |

OTHER PUBLICATIONS

"The Claudius Peters EM–Mill," (Brochure) Claudius Peters AG, 1991.

*Primary Examiner*—Timothy V. Eley
*Attorney, Agent, or Firm*—Birch, Stewart, Kolasch & Birch, LLP

[57] ABSTRACT

Hot gas is introduced into a fluidised bed of granular material, for example gypsum, contained in a vessel 10 having a grinding device or mill 11 in its lower region, which may comprise grinding rollers 15 cooperating with a table 17 on the base of the vessel. The gas may be supplied through a tube 20 passing down through the vessel, while raw material is fed into the bed, preferably by a feed screw 34. The ground product is discharged from the bed by an overflow 28 which determines the level of the bed.

15 Claims, 3 Drawing Sheets

METHOD AND APPARATUS FOR HEATING AND GRINDING MATERIALS

This invention relates to a method of and apparatus for heating and grinding materials that are capable of being maintained in a fluidised bed. It is particularly well suited to calcining and grinding materials such as gypsum, which evolve gases or vapours serving at least in part to fluidise the bed of material under treatment.

BACKGROUND OF THE INVENTION

In the gypsum industry it has traditionally been the practice to crush or grind raw gypsum to a convenient size which is then calcined to produce calcium sulphate hemihydrate (or anhydrite), the dehydrated material being subsequently milled as desired to obtain a product having a particle size and other characteristics appropriate to the intended end use.

It has already been proposed to combine the calcination and grinding of such materials in a single unit. For example, in U.S. Pat. No. 1,984,201 sub-divided gypsum is fed to the mill in a stream of hot gas, and the ground and calcined material is entrained in the hot gas together with a stream of cold gas. Fine calcined material leaves the unit entrained in the gas stream while coarser material falls back into the mill.

Techniques in which a so-called fluidized bed is employed are known from other industries. In British Patent GB-A-1193761 and in a European Patent Application published as EP-A-0 039 270, a granular material to be dried and/or heated and ground is fed through a pneumatic conduit by hot gases into a chamber containing a grinding device. The ground product is discharged from the top of the chamber by entrainment in the exhaust gases, and in the European application a restriction in the cross section of the upper part of the chamber (provided by a series of transverse bars) causes insufficiently ground material to fall back into the grinding zone.

In an earlier device described in British Patent GB-A-1080605 an agglutinant material such as clay is ground, sorted and dried in a fluidization reactor having a percussion grinder wholly or partly immersed in a fluidized bed of the material. In this apparatus, the base of the reactor is perforated in the classical manner of a fluidized bed reactor, and the hot gases entering the reactor through the perforated base not only fluidize the material in the bed but also carry off the product from the top of the reactor.

In these and similar systems the material, even if it forms a definable bed at all, is present in a relatively low density mixture of gas and solids (i.e. a low solid to gas ratio), and the solid to gas ratio is even lower in the upper region of the chamber where the ground material is being exhausted with the gases. Such systems require large solids-gas separators to recover the ground material from the gas stream.

We have invented various systems for the continuous calcination of gypsum in which a bed of gypsum is maintained in fluidised condition at least in part by the water vapour evolved during dehydration, see for example GB 1,018,464, 1,488,665 and 2,043,319. Such systems have greater thermal efficiency than conventional calcination kettles, have reduced maintenance costs and are of lower capital cost. They have been widely adopted in the industry. A significant difference between such fluidised bed systems and the gas entrainment systems mentioned above is that they employ a relatively dense bed (i.e. with high solid to gas ratio) which can be easily discharged under gravity, for example by an overflow or weir. By comparison, the relatively low density streams of gas and solids mentioned earlier involve reduced efficiency and higher costs. Techniques suitable for use with a low solids content gas stream are different from those used in a solids-rich fluidised bed and would not be expected to work in the different situation.

We have now found surprisingly that a rotary grinding or milling machine can function satisfactorily in the bottom of a relatively dense fluidised bed, despite the density of the bed and the very substantial back pressure such a bed exerts in the grinding region. This discovery has enabled us to develop a heating and grinding system having significant potential advantages over conventional equipment for separate calcining and grinding or previously available gas-entrained heating and grinding equipment.

SUMMARY OF THE INVENTION

Accordingly the present invention provides a method of heating and grinding a material which comprises introducing hot gas into a bed of the material to heat and fluidize the bed, grinding the material in the lower region of the bed introducing fresh raw material into the bed and withdrawing ground and heated material from the bed, wherein the material forms an established bed from which at least a significant proportion of the material withdrawn is discharged by gravity flow from the bed.

The invention also provides apparatus for heating and grinding material comprising a vessel adapted to contain a fluidized bed of the material, a grinding or milling device in the lower region of the vessel, a raw material feed for the bed, a hot gas feed for the bed and means for withdrawing heated and ground material from the bed, wherein the vessel has an imperforate base, the hot gas feed comprises one or more tubes extending through the vessel and terminating in an opening or openings in the lower region thereof, and the means for withdrawing material comprises a weir or other gravity device.

The preferred form of grinding machine or mill is a horizontal roller mill in which rotatable grinding rollers are spaced round a rotating grinding table and urged resiliently into contact with raw material on the table by means of springs or an hydraulic pressure system. Such a table can constitute or form part of the base of the vessel supporting the fluidised bed. Alternatively, a horizontal ball ring mill can be employed in which grinding balls cooperate with a driven lower ring under the pressure of a stationary top ring to which spring or hydraulic pressure is applied.

The preferred form of vessel is one which, in the region above the level of the grinding or milling machine, has tapering walls, preferably frustoconical in form, such that the cross-section of the vessel in the region of the top of the fluidised bed of material is substantially greater than that at the level of the grinding or milling machine.

The material in the vessel may be heated by a suitable burner, for example using gas as a fuel, and the burner may be mounted in a tube descending through the vessel to an opening in its lower region. The descending tube may be centrally disposed in the vessel and may be divided at its lower end into branches or a plurality of smaller tubes which descend to openings near the base of the grinding or milling machine. Several descending tubes with burners may alternatively be used. Although a simple chute may be provided for introducing raw material into the body of the bed, for example when chemical gypsum is used as the raw material, it is generally preferred to feed granular raw material into the lower region of the vessel, preferably in the vicinity of the grinding elements, by mechanical means for example a feed screw.

Discharge of heated and ground material of the desired particle size is conveniently achieved by an overflow system such as a weir. Where there is an established bed of fluidised material, the introduction of fresh material through the material feed will displace a corresponding amount of the bed over the weir. In these circumstances the weir determines or regulates the level of the top of the bed and may lead off material from the upper region of the bed or at any level where material is to be found having the desired particle size. If it is found that the product withdrawn at the overflow contains a little oversize material it may be screened and the oversize material returned to the feed. Similarly, although the bulk of the product remains in the bed to be withdrawn under gravity, fines may pass out with the exhaust gases, from which they can be separated by a conventional dust collector. Such fines may be added to the product but, in the system according to the invention, represent only a small proportion of the material treated.

The method and apparatus are especially suitable for heating and grinding materials which react at the temperature of the bed to evolve gases or vapours. They are particularly useful for drying, calcining and grinding gypsum in the form of granular rock gypsum or chemical gypsum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Examples of the method and apparatus according to the invention are illustrated by the accompanying drawings which are given by way of illustration only, and thus are not limitative of the present invention, and in which.

DESCRIPTION OF THE PREFERRED EMBODIMENTS

Figure 1:
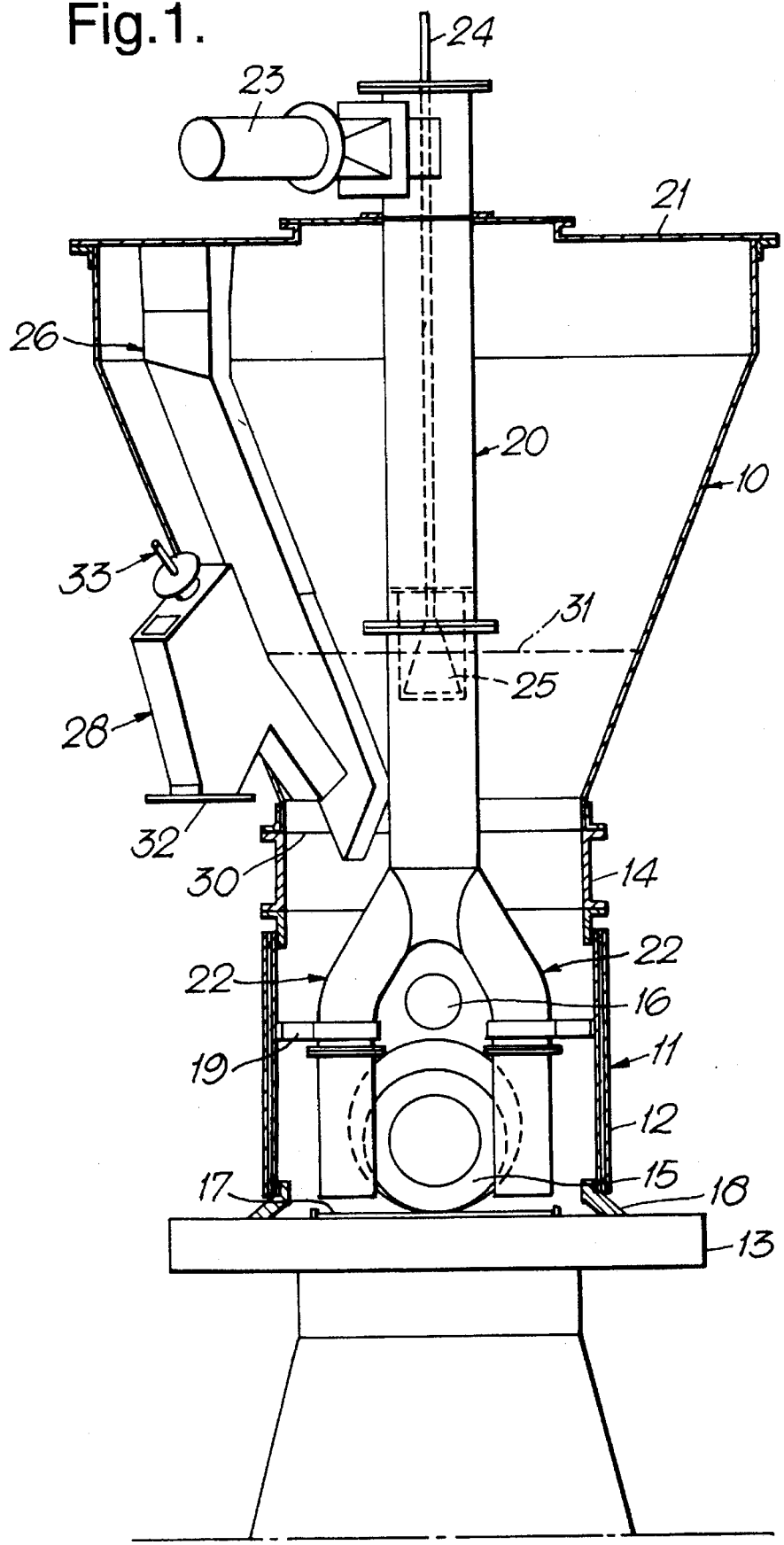
FIG. 1 is a vertical section of one form of apparatus suitable for calcining gypsum.
Figure 2:
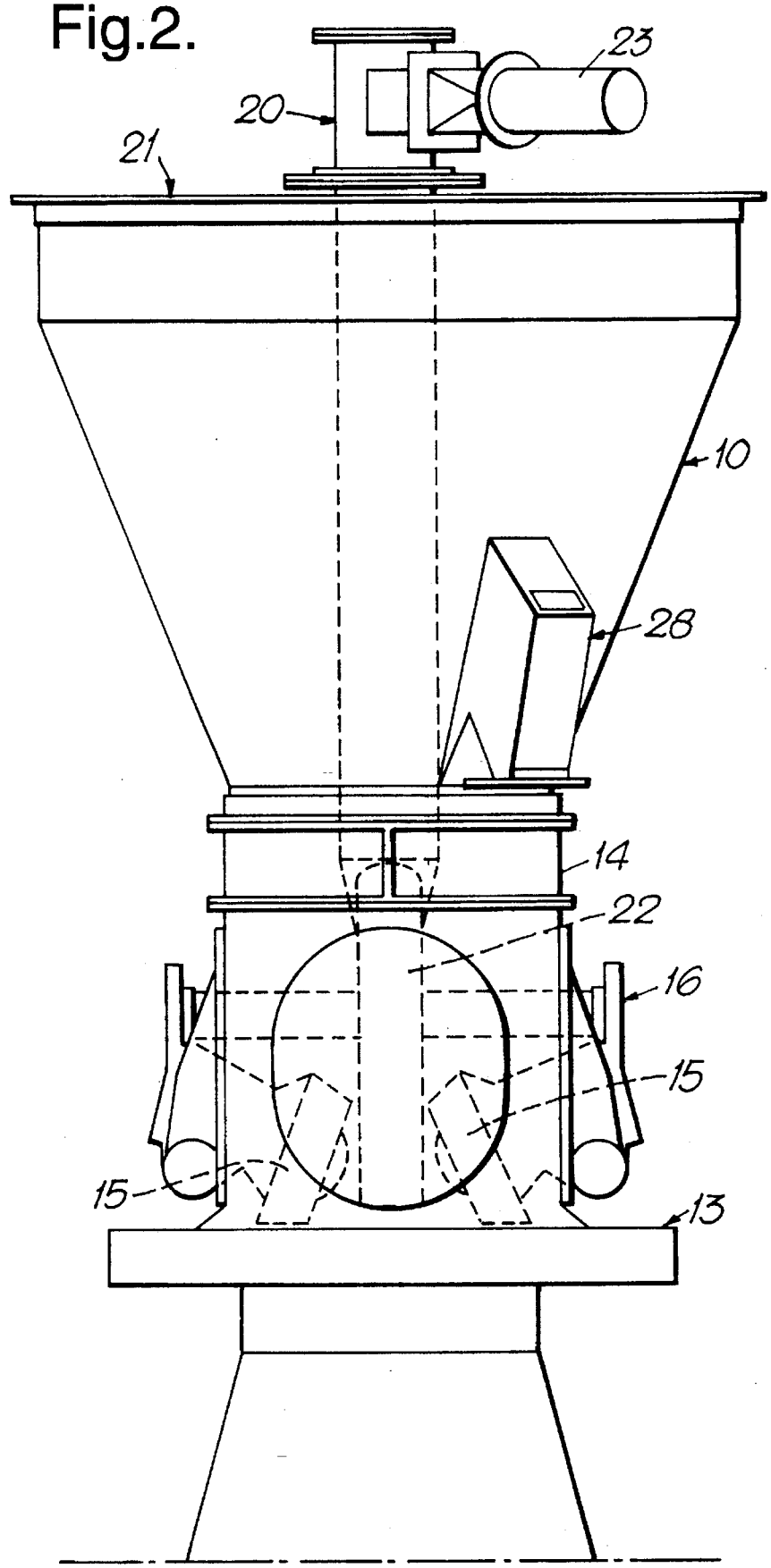
FIG. 2 is a side elevation of the apparatus viewed at right angles to FIG. 1.

In the apparatus shown in FIGS. 1 and 2 a vessel 10 includes an inverted frustoconical upper section with an open bottom mounted on top of a horizontal roller mill 11, which thus constitutes the lower region of the complete vessel. The mill comprises a cylindrical housing 12 and solid base 13, carried on a plinth, and the upper end of the housing wall 12 is joined to the lower end of the conical portion of the vessel 10 by a connecting ring 14. The grinding elements in the mill consist of a pair of opposed tapered grinding rollers 15. These rollers revolve on bearings about respective axes inclined to correspond with the taper angle of the rollers and, in this example, are subjected to pressure by a transverse spring assembly 16. The rollers co-operate with a rotating grinding table 17 carried in the base 13 and rotated by drive mechanism in the plinth. The table thus constitutes the bottom of the vessel.

A sealing element or elements 18 are provided to prevent escape of material between the bottom end of the wall of the vessel and the rotating table structure. It is not intended that solids or gas should pass significantly in either direction through the seal so that, in effect, the bottom of the vessel is closed.

A burner tube 20 passes centrally through the lid 21 of the vessel and axially through the vessel, which is divided in its lower region into two branches or legs 22 which, in the example shown, straddle the pressure spring assembly 16 and extend symmetrically between the grinding rollers to openings near the rotating table 17. They are braced by brackets 19. Air is admitted to the burner tube by means of an inlet 23 and fuel gas by a tube 24, which also carries an electrode assembly for ignition of the burner. A burner nozzle 25 is mounted within the tube 20 at approximately the level of the top of the fluidised bed in the vessel, and the combustion flame extends downwards from the nozzle within the central tube.

A chute 26 passes through the lid 21 and extends downwardly through the vessel to the region of the connecting ring 14 between the conical portion of the vessel and the housing of the mill. Sub-divided raw material can be fed to the top of this chute by any convenient means, for example a feed screw or belt.

A weir assembly 28 is mounted in the wall of the vessel and has an intake opening 30 near the bottom of the conical portion of the vessel and an overflow at the level 31 at which the fluidised bed is to be maintained. The weir may be adjustable to enable the top level of the fluidised bed to be varied. Heated and ground material is discharged through an opening 32, and an air-lance 33 may be provided to assist free flow of the material through the weir assembly.

Exhaust gases leave the vessel 10 by another opening (not shown) in the lid 21 and are led to a conventional dust collector for the removal of fines.

Figure 3:
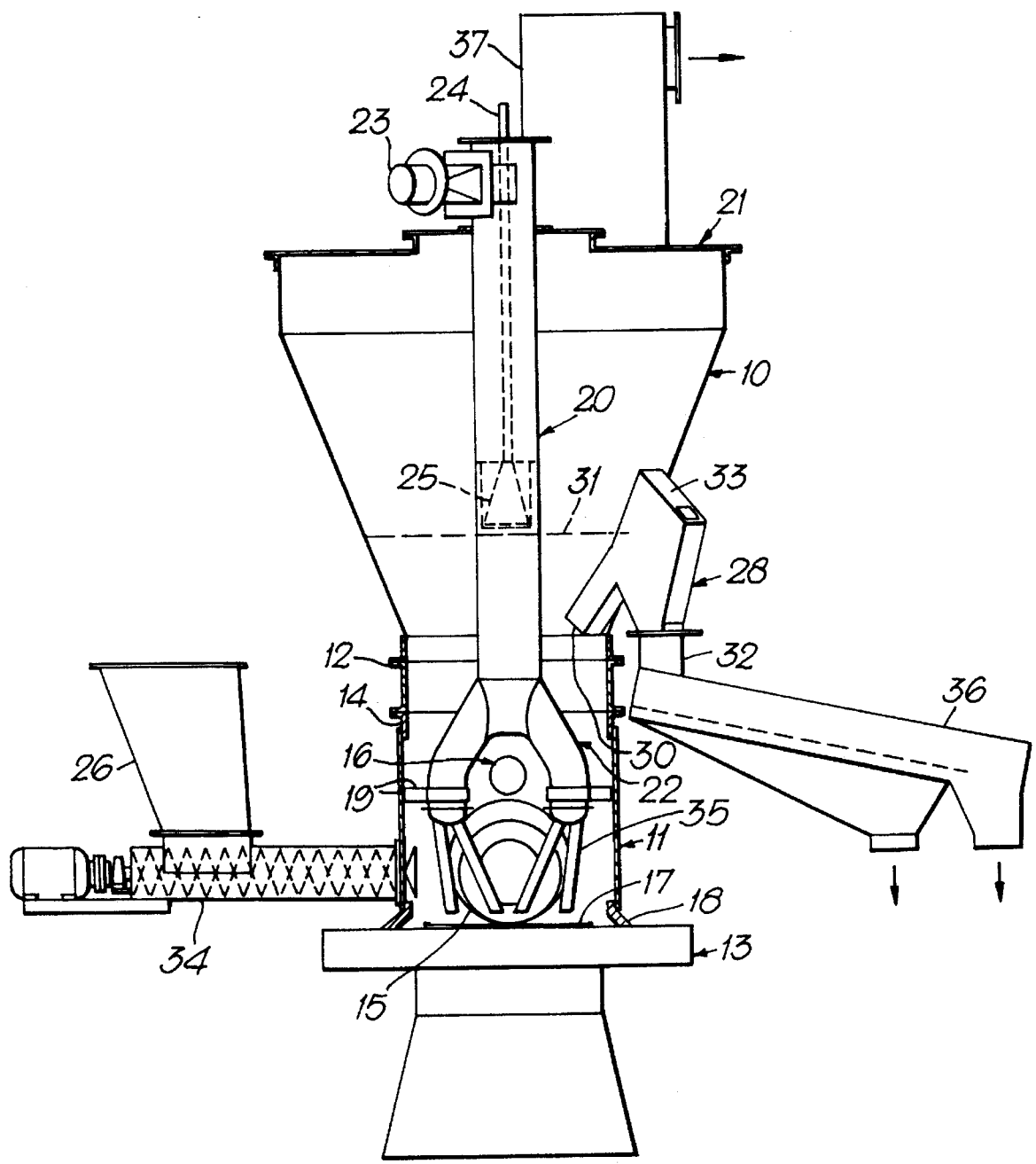
FIG. 3 is a vertical section of a second example of apparatus according to the invention.

A second embodiment of the invention is shown in FIG. 3, where corresponding items are indicated by the same reference numerals as in FIGS. 1 and 2.

The first difference between the apparatus shown in FIG. 3 and that of FIGS. 1 and 2 is in the feed system for the raw material. In FIG. 3 the feed chute 26 delivers granular raw material to a screw feeder 34 which feeds the material through an opening in the mill housing 11 into the lower region of the fluidised bed in the vicinity of the grinding rollers 15.

A further difference lies in the disposition of the hot gas inlet in the bed. In FIG. 3 the branches 22 of the hot gas tube 20 terminate in a plurality of secondary tubes 35, all of which convey the gas to and open in the vicinity of the base 13. In FIG. 3 a transverse spring 16 is shown as in the first embodiment, but this can be replaced by an hydraulic pressure system for the rollers 15. In the absence of a spring crossing the lower part of the vessel, there is no necessity for the lower part of the hot gas tube 20 to be divided, but it is still advantageous for the tube to terminate in a plurality of secondary tubes as shown at 35 in FIG. 3.

Further differences are to be found in the arrangements for the recovery of the product. It is possible that particles above the preferred size range may pass over the overflow 28 with the bulk of the product. To separate these oversize particles a screen 36 may be provided. The desired product passes through the screen and the separated oversize particles may be returned to the feed chute 26.

At the top of the vessel a disengagement box 37 may be fitted over the outlet for exhaust gases to reduce the amount of dust requiring which will have to be separated in the dust collector. Such a box is not necessary if the vessel itself is made taller, in which case initially entrained material within the preferred product size range will be disengaged in the upper region of the vessel itself. The provision of the box is, however, a cheaper alternative.

In operating the equipment described for the drying and calcination of gypsum, the burner is started with a low flame and, when 120°–150° C. is reached, the feed of gypsum is begun. An initial bed of material is built up in the vessel, which is fluidised to some extent by the gases from the burner tube and additionally self-fluidised by the water vapour evolved by the calcining gypsum. At this point, the burner rating is increased and the temperature allowed to rise to a calcination set point of about 150° C. or other appropriate temperature corresponding to the particle product to be made.

The calcined stucco discharged at the weir assembly is found to be of good quality, and adjustments of the grinding and calcining parameters enable stucco of particular characteristics to be produced for example for such different uses as bag plaster or the manufacture of plasterboard.

Rotary horizontal grinding mills of the type employed here are usually operated with a moderated feed of raw material. Such mills do not ordinarily work well when flooded with material. Moreover, a fluidised bed of the kind employed in this invention, for example of gypsum, exerts a considerable pressure at its base. In a practical example the back pressure at the outlet of the burner tube branches 22 with a fluidised bed of gypsum may be 35 inches (890 mm) WG or more. It is most surprising that the grinding or milling equipment described will operate satisfactorily when immersed in a fluidised bed of material and when subjected to the pressure involved. Whereas earlier mills of this type have introduced large quantities of air at the base in order to carry ground particles to the classifier equipment and to prevent the escape of material, such amounts of air are not necessary in the present fluidised bed system.

The apparatus according to the invention has significantly lower capital and operating costs than existing equipment. Moreover, in contrast to gas entrainment systems, large and expensive solids-gas separation systems are not required and dust collection is on a relatively small scale, comparable to that involved in the use of conventional gypsum calcination kettles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of heating and grinding a material which comprises and steps of:

establishing a bed of said material having a lower region and a top level;

introducing hot gas into said bed to heat and fluidize the bed, the material being reacted by the heat supplied by said hot gas;

grinding the material in said lower region of the bed;

introducing fresh raw material into the bed; and withdrawing ground and heated material from the bed, at least a significant proportion of said withdrawn material being discharged by gravity flow from said bed.

2. The method according to claim 1 in which, as raw material is introduced into the fluidised bed, heated and ground material is correspondingly discharged by an overflow which determines said top level of the bed.

3. The method according to claim 1 in which hot gas is introduced into said lower region of the bed through one or more tubes extending through and opening into the bed.

4. The method according to claim 1 in which said material is ground by rotary grinding elements co-operating with a grinding surface, said surface constituting or forming part of a base supporting said bed.

5. The method according to claim 1 in which said material is calcined by said heat and evolves gases or vapours during calcination, and wherein such evolved gases or vapours contribute to fluidisation of said bed.

6. The method according to any of claims 1–4 and 6 wherein the significant proportion of material withdrawn is a major proportion of the material withdrawn.

7. The method according to claim 5 in which said material is gypsum.

8. Apparatus for heating and grinding material comprising:

a vessel adapted to contain a fluidized bed of the material, said vessel having a base, a lower region and an upper region, said base being imperforate;

a grinding or milling device, said device being disposed in the lower region of said vessel;

a raw material feed for said bed disposed to supply raw material into said bed;

a hot gas feed for said bed said hot gas feed comprising one or more tubes extending through said vessel and terminating in an opening or openings in said lower region; and means for withdrawing heated and ground material from the bed, said withdrawing means using gravity flow of material from said bed.

9. The apparatus according to claim 8 in which said base of the vessel comprises a table and said grinding or milling device comprises rotary grinding elements which cooperate with said table for grinding said material.

10. The apparatus according to claim 8 in which said grinding machine is a horizontal roller mill, said mill comprising rotatable grinding rollers, a rotating grinding table and drive means for said table, said rollers being spaced around said table.

11. The apparatus according to claim 8 in which a portion of the upper region of said vessel has tapering walls, such that the cross-section of the vessel in the said upper region is substantially greater than that of said lower region.

12. The apparatus according to claim 8 in which said hot gas feed tube contains a burner, and said tube descends through said vessel to at least one terminal opening in said lower region.

13. The apparatus according to claim 12 in which said descending tube has an upper region and a lower end, said burner-being disposed in said upper region of said tube and said lower end being divided at its lower end into a plurality of secondary tubes, each secondary tube having an open end adjacent said grinding or milling device.

14. The apparatus according to claim 8 in which said withdrawing means includes a weir in the side of said vessel, said weir being adjustable to establish the top level of the fluidised bed in said vessel.

15. The apparatus according to claim 8 in which said raw material feed comprises a feed screw, said feed screw being mounted adjacent said lower region of said vessel and adapted to fee material into said lower region.

\* \* \* \* \*